Dec. 12, 1967  J. G. MARTNER  3,357,641
AEROSOL GENERATOR

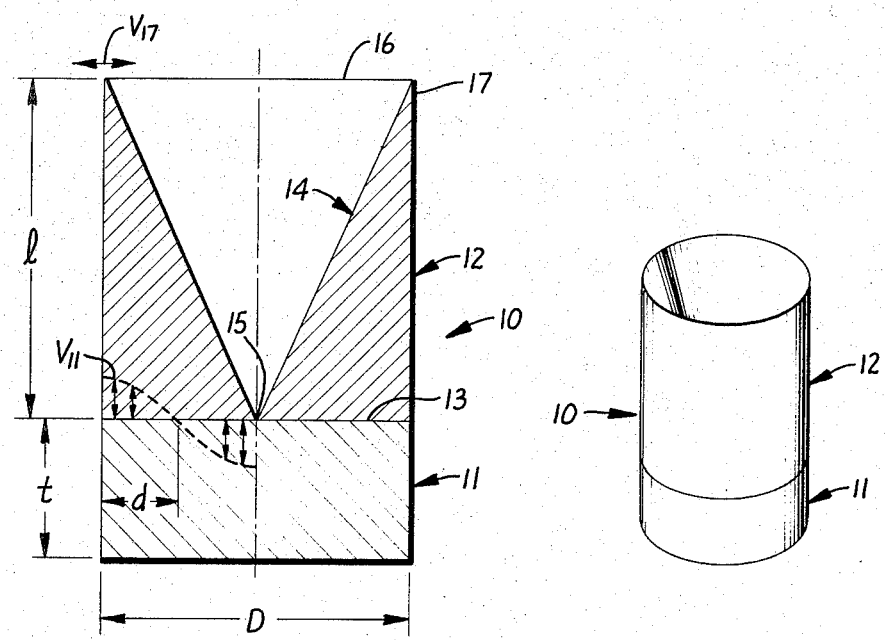
FIG. 1.
FIG. 2.
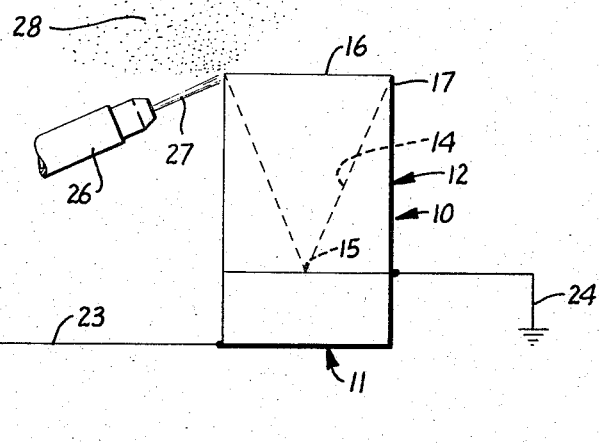
FIG. 3.

Filed Aug. 5, 1965  2 Sheets-Sheet 2

INVENTOR.
JOHN G. MARTNER
BY
ATTORNEY

United States Patent Office 3,357,641
Patented Dec. 12, 1967

3,357,641
AEROSOL GENERATOR
John G. Martner, Atherton, Calif., assignor to Stanford Research Institute, Menlo Park, Calif., a corporation of California
Filed Aug. 5, 1965, Ser. No. 477,522
7 Claims. (Cl. 239—102)

ABSTRACT OF THE DISCLOSURE

An aerosol generator is provided which comprises a piezoelectric disc or annulus capable of vibrating at a high frequency in response to an applied high frequency voltage, together with a member driven by the piezoelectric member and which is juxtaposed to the piezoelectric member and has a hollow, conical cavity, such conical cavity being inverted (its apex being adjacent the piezoelectric member, its base being remote from the piezoelectric member), such cavity also providing a thin lip at the far end of the driven member. Vibration of the piezoelectric member in planes parallel to its axis cause vibration of the aforesaid lip in planes normal to such axis. A stream of liquid impinging on this vibrating lip is converted to a mist, spray or aerosol.

---

This invention relates to an electro-mechanical transducing device whereby electrical oscillation derived from any suitable power source causes mechanical oscillation of a piezoelectric device which, in turn, causes mechanical oscillation or vibration of a solid cylinder having a central, conical cavity which provides a thin edge or lip remote from the piezoelectric device. This thin edge or lip vibrates at a frequency and amplitude such that it is useful to convert liquid into a fine spray or aerosol.

In a paper published jointly by J. S. Arnold and myself in the Journal of the Acoustical Society of America, volume 31, No. 2, pages 217–226 (February 1959) certain properties of a piezoelectric disc of barium titanate ceramic are discussed, more particularly the characteristics of such a disc when an oscillating voltage is applied.

I have now discovered that when a flat face of such a disc is affixed to a flat end face of a solid cylinder which is formed with a cavity having the shape of an inverted cone (with the apex of the cone at or near the interface between the cylinder and the piezoelectric device and with the base of the conical cavity forming a thin edge or lip at the upper end of the cylinder), a very simple and efficient aerosol generator and/or sprayer is provided.

Among the advantages of such an aerosol generator are the following:

The device requires only that one or more streams of liquid be brought into contact with a surface (preferably the outer surface) of the aforementioned lip. The vibration of this lip which is induced by oscillation of the piezoelectric device, functions to convert the liquid stream or streams into a fine spray, mist and/or aerosol. In some previous types of aerosol generators and sprayers, it is required that liquid be forced or sucked through small orifices. These small orifices are easily clogged, or corroded by the liquid or eroded by entrained solids and by the mechanical force of the liquid itself. Unlike a conventional sprayer, the ultrasonic sprayer described herein does not require a high pressure liquid supply and its atomizer contains no small internal passages. The low liquid pressure requirement permits the use of a small inexpensive pump which may be driven by an inexpensive shaded-pole type motor. Since there are no small restrictions in the spraying lip assembly or in the liquid feed system, it is possible to use coarse filtering and to have a low plugging rate. Also, vibration of the liquid delivery apparatus which is brought about by vibration of the generator tends to shake loose and dislodge any solid particles as they accumulate in the liquid delivery apparatus.

Also the device of the present invention, if designed in accordance with criteria set forth below, has an aerosol delivery capability greatly in excess of other previous ultrasonic sprayers.

Certain forms of the apparatus of the present invention and a system employing that apparatus are illustrated by way of example in the accompanying drawing, in which:

FIGURE 1 is a view in longitudinal (axial) midsection through one form of device.

FIGURE 2 is a perspective view of the device of FIGURE 1.

FIGURE 3 illustrates diagrammatically a complete system including the device of FIGURE 1, a power source and a means for applying liquid to the apparatus.

Figure 4:
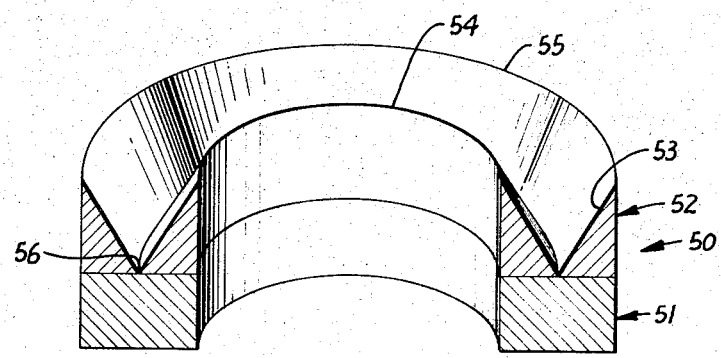
FIGURE 4 is a cross sectional, perspective view of an alternative form of device in accordance with the invention.

Referring now to FIGURES 1 and 3, the apparatus is generally designated by the reference numeral 10 and it comprises a disc 11 which is of piezoelectric material and upon which is mounted a cylinder 12. The interface between the disc 11 and the cylinder 12 is indicated as 13. These two elements (the disc 11 and the cylinder 12) may be affixed to one another at the interface 13 by any suitable adhesive such as a conductive epoxy. (A conductive bond is used so that it can serve as an electrode. Conductive epoxy and other suitable resins containing metal powder are well known.)

The disc 11 is preferably circular in cross section, although other shapes such as that shown in FIGURE 4 (described below) may be employed. The cylinder 12 is also preferably circular in cross section and preferably has the same radius as the disc 11, although other shapes are permissible as with the disc 11, and although some departure of the size and radius of the cylinder from the size and radius of the disc are permissible. Limitations in sizes and shapes are imposed by design criteria related to optimum vibrational amplitude, frequency, efficiency, and other construction. Details of two models that have been in use are described below.

The cylinder 12 is solid except for a cavity 14 which is in the form of an inverted cone, the apex of which, shown at 15, is located at or near the interface 13. The base of the cone, indicated at 16, is at the upper end of the cylinder 12. There is provided at the upper end of the cylinder 12 a thin edge or lip 17 which is in the form of a continuous ring or annulus. It is this lip which vibrates, against which liquid is impinged and which converts the liquid into a fine mist or aerosol.

It will be understood that the shape of the cavity 14 may vary from that of a cone generated by rotation of a right triangle about a leg. Thus other conoidal shapes may be employed. However, a true conical shape as illustrated simplifies calculations of the vibrational characteristics of the cylinder 12, as is explained infra.

It will also be understood that the terms "upper" and "lower" are for convenience of description, inasmuch as the apparatus 10 may be inverted or it may be held at any angle.

Referring now to FIGURE 3, the system there shown includes the apparatus or device 10 shown in FIGURES 1 and 2. A signal generator is shown at 20, for example, a Hewlett-Packard 650A signal generator, capable of generating electrical pulses at a frequency of 10 kc./s. to 10,000 kc./s. The output of this generator is connected to the input of an amplifier 21 which may be of any suitable type, for example, General Radio 1233A. A common ground connection for the signal generator and amplifier is provided by a wire 22. The amplified signal output is applied by a wire 23 to the lower face of the disc 11, the upper face of which (i.e., the face which is adjacent the lower end of the cylinder 12) is connected by a wire 24 to ground.

A nozzle 26 is provided from which a stream of liquid is delivered as shown at 27. This liquid is delivered against the thin upper edge or lip 17 of the cylinder 12. The solid stream of liquid is converted to a mist, spray or aerosol, as shown at 28. This aerosol may, for example, be directed into a burner chamber or wherever else desired.

The nozzle 26 need not have a very small orifice. Instead of employing a single nozzle as indicated in FIGURE 3, a number of nozzles may be employed and spaced about the lip 17. Alternatively a manifold in the form of a tubular ring or ring segment with inwardly directed outlet openings may be provided, which surrounds the cylinder 12 and is located to direct streams of liquid onto the lip 17 of the cylinder.

In selecting the materials and in designing the apparatus of the invention, the following criteria are helpful:

The disc 11 may be of any piezoelectric material. In addition to barium titanate ($BaTiO_3$), or any other artificially polarized ferro-electric material, it may be, for example, any of the following: Quartz, Rochelle salt, turmaline.

The cylinder 12 may be made of metal, preferably a light metal such as aluminum or an aluminum alloy or a magnesium alloy; also steel, brass and other metals. It may also be made of synthetic plastics, very hard rubber and the like. Suitable plastics are phenol-formaldehyde resins, Lucite, urea-formaldehyde, etc.

In designing the disc 11 and the cylinder 12 the following factors are helpful:

As regards the material of which disc 11 is constructed it should have good piezoelectric properties and it should be durable and resistant to ambient influences, such as heat below the curie temperature of the material used (i.e., the temperature at which the material undergoes a change of state which destroys or impairs its polarizability), or cold, corrosive agents, etc. Likewise the material of construction of cylinder 12 should be selected in the light of ambient conditions (temperature, corrosiveness etc.) and it should be durable in the presence of fatigue which causes stresses. Referring to FIGURE 1, the thickness and diameter of the disc 11 are indicated as $t$ and $D$, respectively; the height of the cylinder 12 is indicated as $l$; and the symbol $d$ designates the half length of the base of the right triangle formed by passing a plane axially through the cylinder 12. (There are, of course, two such right triangles.) The mode of vibration of the disc 11 is indicated by the dotted curve $V_{11}$ and the mode of vibration of the lip 17 is indicated by the double-headed arrow $V_{17}$.

The geometry of the disc 11 is preferably such that, at its second lowest natural frequency, it vibrates at a frequency not less than about 10 kc. If the thickness $t$ of the disc 11 is increased, its natural frequency decreases and a point will be reached at which an aerosol will not be produced, or will be produced very inefficiently. A vibration of lip 17 not less than about 10 kc. is preferred. If the thickness at the tip of the lip is diminished too greatly, mechanical failure may result. Also, as the diameter D increases the natural frequency of the disc 11 will decrease, but if the diameter is made too small the power transmitted to the cylinder 12 will become undesirably small.

In resume, the size of the disc is determined by the following parameter and physical considerations: Spray particle size and liquid particle size, generated at a vibrating surface, depend to a large extent on the frequency of vibration of said surface (i.e., 40 kc./s. frequency will produce approximately 100 micron diameter droplets. These values apply to water as the liquid). Since disc diameter and thickness control the frequency, hence: droplet size desired is controlled by disc size.

Models were constructed having a two inch diameter barium titanate disc whose height was 1.25 inches. This provided a resonant frequency of 40.5 kc./s. for the whole unit and an approximate droplet size of 98 microns, using water as the liquid.

The height ($l$) of cylinder 12 may be varied considerably. Cylinder size is also controlled by the droplet size desired (according to the application intended). To facilitate the design of an intended application it is preferable to keep the diameter of the cylinder the same as that of the disc and to vary the height of the cylinder. In view of this, it has been found that one can use, on a first approximation, the classical equation that describes the vibration of the cross section used. (In the present case, the cross section in point is a wedge whose base is affixed to the disc and whose apex constitutes the lip above-mentioned.) The equation is the following:

$$(1) \qquad f = \frac{J_o d}{4\pi^2 l^2} \sqrt{\frac{E}{3\rho}}$$

wherein $f$ is the frequency in cycle per second, $J_o$ is a constant depending upon the shape of the wedge or right triangle shown in FIGURE 1, E is Young's modulus for the material of the wedge (i.e., of cylinder 12), $\rho$ is the density of this material in grams per cc., $d$ is half the length of the base of the wedge in cm. and $l$ is the height of the wedge in cm.

Replacing the actual values for the fundamental frequency type unit constructed it was found, on a first approximation, that the length $l$ for said unit was given by Equation 2 which is the same as 1 solved for $l$:

$$(2) \qquad l = \sqrt{\frac{J_o d}{4\pi^2 f}} \sqrt{\frac{E}{3\rho}}$$

The material was aluminum for which:

$$E = 6.8 \times 10^{11} \left[\frac{dynes}{cm.^2}\right]$$

$$\rho = 2.7 \left[\frac{gr.}{cm.^3}\right]$$

The disc was a barium titanate piece of 5.1 cm. diameter and 2.84 cm. thick which vibrated with a second lower resonant frequency of $40.2 \times 10^3$ c.p.s.

To keep the diameter of the cylinder the same as that of the disc, one must make $d=1.25$ cm. The cross section of the cylinder (as shown in FIGURE 1) is that of a wedge: then $J_o=5.48$; Bessell function for said shape (obtained from Timoshenko's text on Mechanics).

Replacing the given values in Formula 2 one obtains:

$$(2a) \qquad l = \frac{5.48 \times 2.5}{4 \times 3.14 \times 40.2 \times 10^3} \sqrt{\frac{6.8 \times 10^{11}}{3 \times 2.7}} \text{ (cm.)}$$

$$l = 2.6 \text{ (cm.)}$$

The resonator shown in Table I (next page) denoted as a 4th enharmonic type was designed by referring to the text, "Theory of Vibrations," by McLachlan Dover, page 128, whereby the relationship between the 4th enharmonic frequency and that of the fundamental equals 9.48.

TABLE I

| (1) Design of Aerosol Generator | (2) Frequency of operation (KHz) | (3) Total weight of the device tested (gr.) | (4) Aerosol delivery capacity, cc. H₂O/min. | (5) Total effective surface that generates aerosol approx. (cm.²) | (6) Electric power requirements to drive the unit (watts) | (7) Spray capability, $E = \frac{(4) \times (5)}{(3) \times (6)}$ |
| --- | --- | --- | --- | --- | --- | --- |
| Resonator of invention, 4th enharmonic | 40.6 | 680 | 760 | 6.3 | 27.1 | .259 |
| Resonator of invention, fundamental mode type | 40.2 | 457 | 1,350 | 15.7 | 23.2 | 1.92 |
| Exponential horn type (prior art) data obtained from literature | ≈57.0 | ≈600 | ≈35 | ≈0.22 | 7.9 | .00162 |

Figure 5A:
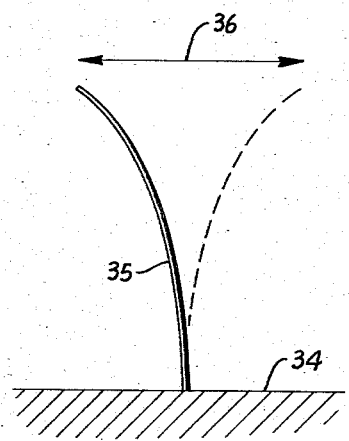
FIGURES 5A and 5B are diagrammatic views showing two modes of vibration of a reed and illustrating certain parameters of the present invention.

Replacing the proper values in Equation 2 one obtains, as shown hereabove, a cylinder whose height is 8.57 cm. and said cylinder will vibrate on the 4th enharmonic mode with the frequency of 40.6 kc./s. As shown in Table I, this cylinder will not be as efficient as one vibrating on the fundamental frequency. This is due to the fact that its effective spraying surface is smaller than that of a fundamental mode. This may be better explained by reference to FIGURES 5A and 5B where the mode of vibration of the two types is described. In both FIGURES 5A and 5B, a reed 35 is affixed at one end to a solid support 34 and is free at its other end. The reed in FIGURE 5A is shown as vibrating at the fundamental mode, that in FIGURE 5B at the 4th enharmonic.

Figure 5B:
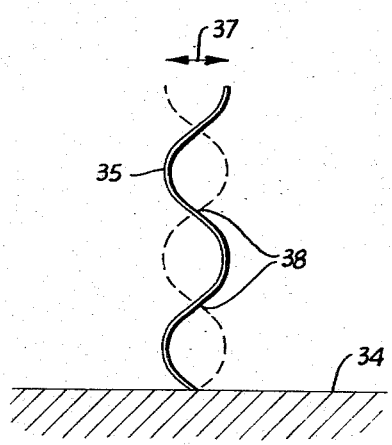

Temporary displacement of the upper end will cause the reeds to vibrate with an amplitude at the lip denoted by 36 and 37. The reed in FIGURE 5A is shown as vibrating at the fundamental mode with one mode at the attachment point. The reed in FIGURE 5B is shown as vibrating to produce four nodes 38. Its vibration displacement is smaller than that of the reed in FIGURE 5A vibrating in the fundamental mode. The former is said to vibrate in the 4th enharmonic mode of the fundamental.

The shape of the piezoelectric disc and of the associated vibrating member need not be cylindrical. Referring to FIGURE 1, it will be seen that electrically induced vibration of a thin vertical section of the disc 11 in a vertical plane is converted into vibration of the overlying wedge in a horizontal plane. This same geometry may be obtained with other shapes, e.g., with the annular shapes of FIGURE 4.

Referring to FIGURE 4, the device 50 there shown comprises a circular piezoelectric ring 51 to which is affixed a circular ring 52 having an annular, concentric, conical cavity 53 which forms inner and outer lips 54 and 55. Within the limits of proper design parameters, vibration of the piezoelectric ring 51 will cause vibration of the lips 54 and 55 at a frequency sufficient to convert a stream of liquid into an aerosol.

It will, therefore, be apparent that I have provided a novel and very useful apparatus for producing mists, sprays and aerosols.

I claim:

1. Apparatus of the character described comprising a piezoelectric driving member having opposite parallel faces and so shaped that, when an oscillating electric potential is applied across said faces, the member will oscillate in radial planes normal to said faces, said member having adhesively bonded to at least one of its faces one end of a driven member having an axially oriented cavity which, in axial cross section, is in the shape of a triangle having its apex adjacent the interface between the driving and driven members and having its base adjacent the other end of the driven member and forming a lip at said other end.

2. The apparatus of claim 1 wherein the dimensions and materials of said driving and driven members are such that, when a potential pulsing at 10 to 10,000 kc./s. is applied across said faces, said lip will vibrate at a frequency sufficient to convert a stream of water applied to the lip into a spray.

3. The apparatus of claim 2 wherein said driving and driven members are in the form of solid disc and a cylinder, respectively, and said cavity has the shape of a right cone.

4. The apparatus of claim 2 wherein said driving member is in the form of a solid, circular ring and said driven member is also in the form of a circular ring and said cavity is concentric to such ring and in cross section has the shape of a triangle.

5. The apparatus of claim 3 in combination with means for delivering a stream of liquid to a surface of said lip.

6. The apparatus of claim 4 in combination with means for delivering a stream of liquid to a surface of said lip.

7. Apparatus of the character described comprising first and second members having circular shapes and having substantially the same radius, one end of each member being bonded to an end of the other member such that the two members are substantially co-axial; one of said members being piezoelectric and having the property of oscillating in an axial direction and radial planes; the other of said members having formed therein a cavity which is symmetrical with respect to the axis of said member and which in cross section has the shape of an inverted triangle having its apex adjacent the interface between said members and its base at the opposite end of said member and forming a thin lip; the dimensions of said members being such that the piezoelectric member is capable of oscillating at a high frequency in response to an oscillating potential applied across the opposite faces of such member, and said lip will also oscillate at a high frequency sufficient to convert a stream of liquid applied thereto into a spray.

References Cited

UNITED STATES PATENTS

| | | | |
| --- | --- | --- | --- |
| 3,292,910 | 12/1966 | Martner | 310—8.3 X |
| 2,565,159 | 8/1951 | Williams | 310—8.1 X |
| 2,735,024 | 2/1956 | Kulcsar | 310—8.3 |
| 2,812,612 | 11/1957 | Vang | 239—102 X |
| 2,863,075 | 12/1958 | Fry | 310—8.1 |
| 3,019,660 | 2/1962 | Welkowitz | 181—0.5 |
| 3,019,661 | 2/1962 | Welkowitz | 181—0.5 |
| 3,155,141 | 11/1964 | Doyle et al. | 239—4 X |

FOREIGN PATENTS 807,080  1/1959  Great Britain.

M. HENSON, WOOD, JR., *Primary Examiner.*

V. C. WILKS, *Assistant Examiner.*